United States Patent
Dupis et al.

(10) Patent No.: US 8,311,494 B2
(45) Date of Patent: Nov. 13, 2012

(54) TEST UNIT FOR TESTING THE FREQUENCY CHARACTERISTIC OF A TRANSMITTER

(75) Inventors: Francois Dupis, Pibrac (FR); Xavier Hue, Cugnaux (FR); Lionel Mongin, Cugnaux (FR); Jacques Trichet, Cugnaux (FR)

(73) Assignee: Freescale Semiconductor, Inc., Austin, TX (US)

( * ) Notice: Subject to any disclaimer, the term of this patent is extended or adjusted under 35 U.S.C. 154(b) by 635 days.

(21) Appl. No.: 12/518,852

(22) PCT Filed: Dec. 15, 2006

(86) PCT No.: PCT/IB2006/055061
§ 371 (c)(1),
(2), (4) Date: Jun. 11, 2009

(87) PCT Pub. No.: WO2008/072036
PCT Pub. Date: Jun. 19, 2008

(65) Prior Publication Data
US 2010/0014570 A1   Jan. 21, 2010

(51) Int. Cl.
*H03C 1/62* (2006.01)
*H04B 17/00* (2006.01)
(52) U.S. Cl. ................................................ 455/115.2
(58) Field of Classification Search ............... 455/67.11, 455/67.14, 115.1, 115.2; 375/224; 324/76.11
See application file for complete search history.

(56) References Cited

U.S. PATENT DOCUMENTS

| | | | | |
|---|---|---|---|---|
| 5,943,617 A | * | 8/1999 | Nakamura | 455/423 |
| 6,486,691 B2 | * | 11/2002 | Tsujii | 324/762.02 |
| 7,652,532 B2 | * | 1/2010 | Li et al. | 330/149 |
| 2008/0291987 A1 | * | 11/2008 | Kumaki et al. | 375/224 |

FOREIGN PATENT DOCUMENTS

| EP | 0882994 A | 12/1998 |
|---|---|---|
| EP | 1513271 A | 3/2005 |
| WO | 03028248 A | 4/2003 |

OTHER PUBLICATIONS

International Search Report mailed Aug. 22, 2007 for International Application No. PCT/IB2006/55061, 2 pages.

* cited by examiner

*Primary Examiner* — Nguyen Vo

(57) ABSTRACT

A test unit for testing the frequency characteristics of one or more components of a transmitter of modulated signals. The test unit includes a data source for generating a test pattern of data. A test unit output is connected to the data source and connectable to an input of one or more of the components, for inputting the test pattern of data to the one or more components. The test unit includes a memory in which a first predetermined data sequence and a second predetermined data sequence are stored. The data source is connected with an data input to the memory, and the data source is arranged to generating the test pattern of data including the predetermined data sequences. When a modulated signal is generated in accordance with the test pattern of data will include a first signal part with a first frequency spectrum caused by the first predetermined data sequence and a second signal part after the first signal part, which second signal part has a second frequency spectrum caused by the second predetermined data sequence.

19 Claims, 3 Drawing Sheets

Fig. 8 A B C
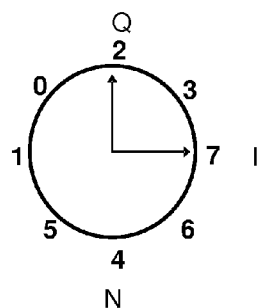 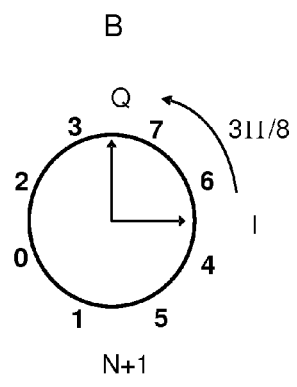 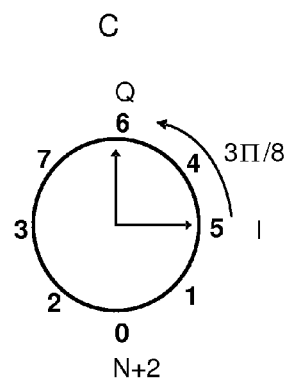
Fig. 9A
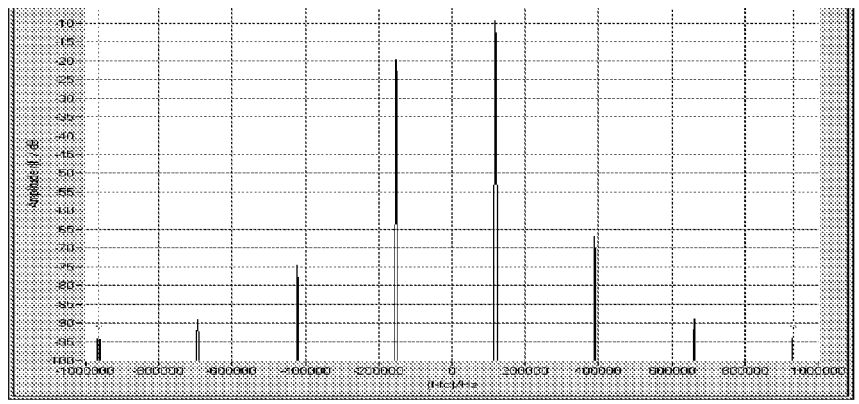
Fig. 9B
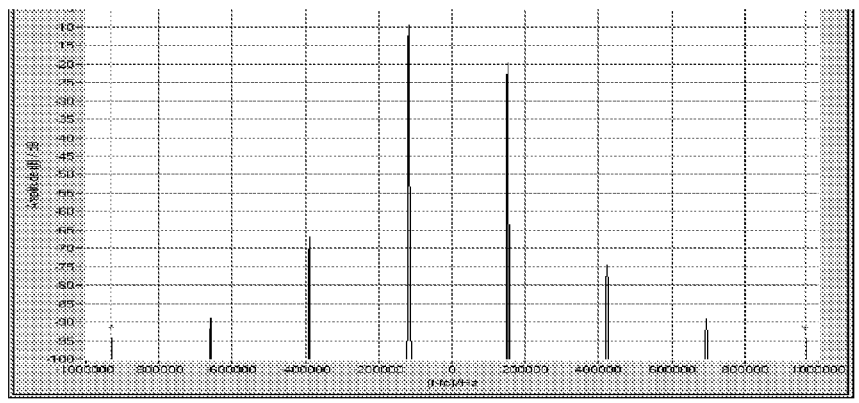

TEST UNIT FOR TESTING THE FREQUENCY CHARACTERISTIC OF A TRANSMITTER

FIELD OF THE INVENTION

This invention relates to a test unit, a data carrier, a transmitter component, a transmitter unit, a method for testing, a method for optimising component of a transmitter, and a computer program product.

BACKGROUND OF THE INVENTION

In the art of data communication, it is known to test a transmitter unit for the power outputted in the different frequency bands. For instance, 3GPP standard document 3G TS 51.010-1 provides specification for testing whether or not an output RF spectrum (ORFS) of an Enhanced Data rates for Global Evolution (EDGE) transceiver complies with the requirements set by the part of the 3G standards relating to EDGE telecommunication systems.

Known methods for testing whether or not the output RF spectrum complies with the EDGE standard include observing the output power spectrum over a couple of hundreds of bursts. The burst include a random bit pattern. The bursts are generated by generating data packets incorporating the random bit pattern in the data packet and generating a phase shift keying (PSK) modulated signal according to the generated data packet. The PSK modulated signal is subsequently inputted to the transmitter unit to be tested. The RF spectrum of the signals outputted by the transmitter unit is monitored to measure whether the ORFS complies with the EDGE standards.

However, a general disadvantage of the known test methods is that they are time consuming since hundreds of burst are used to get an accurate and stable measurement. Furthermore, the known test methods do not give a clear insight in the characteristics of the tested components.

SUMMARY OF THE INVENTION

The present invention provides a test unit, a data carrier, a transmitter component, a transmitter unit, a method for testing, a method for optimising component of a transmitter, and a computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments will be described, by way of example only, with reference to the drawings.

FIGS. 8A-C illustrate phase shift keying with a phase offset.

FIGS. 9A and B show examples of frequency spectra obtained with an example of a method for testing frequency behaviour.

DETAILED DESCRIPTION OF THE PREFERRED EMBODIMENTS

Figure 1:
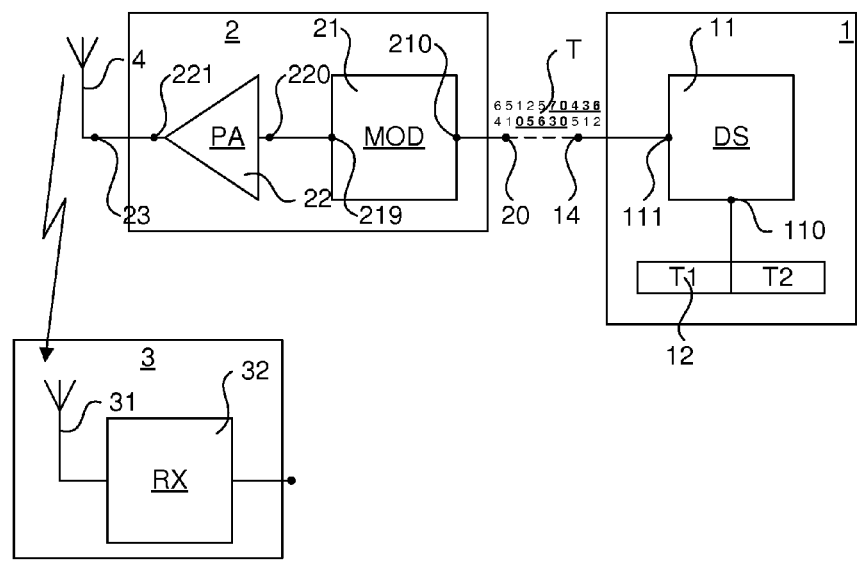
FIG. 1 shows a block diagram of a first example of an embodiment of a test unit.

Referring to the example of FIG. 1, an example of a test unit 1 is shown. The test unit 1 may be used to test the frequency characteristics of one or more components 21,22 of a transmitter 2. The test unit 1 may for instance be used to determine the frequency spectrum of the transmitter 2 or of the components 21,22. The test unit 1 may for example generate a test signal $S_{test}$ which can be inputted in the transmitter 2 or in one or more transmitter components 21,22. The test unit 1 may be part of a testing arrangement which further includes a receiving unit 3. The receiving unit 3 may for example receive a modulated signal $S_{RF}$ outputted by the transmitter 2 (or by one or more components of the transmitter 2) in response to the test signal $S_{test}$ and determine the frequency spectrum of the modulated signal $S_{RF}$.

As shown in FIG. 1, the test unit 1 may include a data source 11 which is connectable via a test unit output 14 to one or more components 21,22 of a transmitter 2 of modulated signals. The data source 11 may generate a test pattern T of data. The test pattern T may include a sequence of symbols. In the example of FIG. 1, decimal symbols are shown, however the symbols may also be (sequences of) binary symbols, hexadecimal symbols or other types of data.

A test signal $S_{test}$, for example a modulated signal $S_{RF}$, may be generated in accordance with the test pattern T. For example, a base-band test signal $S_{base}$ corresponding to the test pattern T may be generated. For instance, the test pattern T may consist of binary numbers and a digital base-band test signal $S_{base}$ may be generated in accordance with the order and binary values in the test pattern T. The digital signal $S_{base}$ may then be modulated to generate a modulated test signal $S_{RF}$. Also, for example, the modulated signal $S_{RF}$ may be generated by controlling one or more modulation parameters in accordance with the test pattern T. For instance, the test pattern T may include a sequence of (decimal) symbols and a parameter of the modulated signal $S_{RF}$ may be set to a value corresponding to the respective symbol. The modulation parameter may for example be the phase $\phi$, the amplitude A, or the frequency f of the signal $S_{test}$. For example, the phase $\phi$ of a periodic signal may be varied in accordance with the symbol in the test pattern T, as is explained below in more detail, and the periodic signal may be mixed with another signal to obtain a modulated signal.

As shown in the example of FIG. 1, the data source 11 may for instance generate the test pattern T and output the test pattern T at the test output 14. The test pattern T may be inputted to an input of the transmitter component(s) to be tested, for instance to an input 20 of the transmitter 2. As shown in the example of FIG. 1, for instance, the transmitter 2 may include a modulation unit 21 and a power amplifier 22. The modulation unit 21 may for example be connected with an input 210 to the transmitter input 20. An output 219 of the modulation unit 21 may be connected to an input 220 of the power amplifier 22. The output 221 of the power amplifier 22 may be connected to an output 23 of the transmitter 2. As shown in FIG. 1, the transmitter 2 may be connected with the transmitter output 23 to other devices or components, such as an antenna 4.

The transmitter 2 may generate a test signal $S_{test}$, such as a modulated test signal $S_{RF}$, from the test pattern T. However, as is explained below in more detail with reference to FIG. 4, it is also possible that the test unit 1 itself generates a test signal $S_{test}$ suitable to be inputted in the component 21,22 to be tested from the test pattern T. The test unit 1 may then input the test signal $S_{test}$ into the respective component 21,22 of the transmitter 2.

Figure 5:
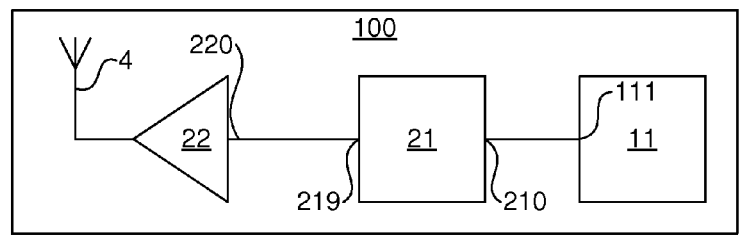
FIG. 5 shows a block diagram of a third example of an embodiment of a test unit.

The test unit 1 may further be implemented as a part of a telecommunication system and for example be integrated in an integrated circuit package. As shown in FIG. 5, for instance the test unit 11 may be implemented in a communication device 100, for example to test the transmitting components 21,22 in the communication device 100.

Figure 4:
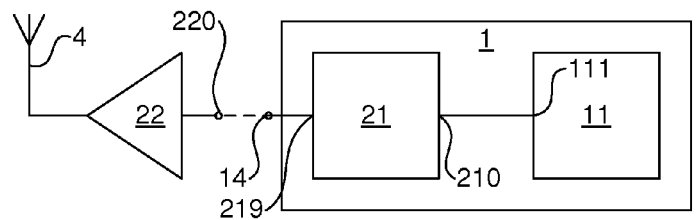
FIG. 4 shows a block diagram of a second example of an embodiment of a test unit.

For instance, separate components 21,22 of a transmitting unit 2 may be tested. The test unit 1 itself may include one or more transmitter components 21,22. The transmitter components in the test unit 1 may be components which would be positioned in a transmitting unit, in a signal processing direction, upstream of the component to be tested and which can generate the signal to be inputted in the transmitter component to be tested. For example, as shown in FIG. 4, the test unit 1 may include a modulation unit 21 with a modulation output 219 which is connected to the test unit output 14 and, as indicated with the dashed line in FIG. 4, is connectable to an amplifier input 220 of a separate power amplifier 22. The modulation unit 21 in the test unit 1 may generate a modulated test signal $S_{RF}$ which can be inputted in the power amplifier 22, to test the characteristics of the power amplifier 22.

As shown in FIG. 1, the test unit 1 may include a memory 12 in which a first predetermined data sequence T1 and a second predetermined data sequence T2 are stored. The data source 11 may be connected with an data input 110 to the memory 12. The data source 11 may include the predetermined data sequences T1,T2 in the test pattern T (in FIG. 1, the predetermined data sequences T1,T2 are shown in bold face and underlined, for sake of clarity).

As is explained below in more detail, the first predetermined data sequence T1 may cause the modulated signal $S_{RF}$ to have, during a first period of time, a first signal part S1 with a first frequency spectrum and the second predetermined data sequence T2 may cause, during a second period of time different from the first period of time, the modulated signal $S_{RF}$ to have a second signal part S2 with a second frequency spectrum. Thereby, the effect of the component 21,22 to be tested on the spectrum of the modulated signal can be determined in a relatively simple manner.

For instance, the part of the signal outputted by the component 21,22 which corresponds to the first signal part S1 may be compared with a first criterion and the part of the signal outputted by the component 21,22 which corresponds to the second signal part S2 may be compared with the second criterion, Also, for example, a comparison may be made between the part of the signal outputted by the component 21,22 which corresponds to the first signal part S1 with the first signal part S1. Furthermore, a comparison may be made between the part of the signal outputted by the component 21,22 which corresponds to the first signal part S1 part of the signal outputted by the component 21,22 which corresponds to the second signal part S2.

Furthermore, the time required to determine the effect of the component 21,22 to be tested on the spectrum of the modulated signal can be relatively short since, by means of the first and second predetermined data sequence T1,T2, the desired test conditions, may be made to occur. The first and second predetermined data sequence T1,T2 may for instance be selected in such a manner that a desired amount of difference in the relevant aspects of the frequency spectrum may be obtained. For example, as is explained below in more detail, the first predetermined data sequence T1 may cause a modulated signal spectrum with an upper side band (rejected side band) which is much stronger than the lower side band at a desired frequency of interest and the second predetermined data sequence T2 may cause in the same manner a modulated signal spectrum with a lower side band which is much stronger than the upper side band (rejected side band), thus enabling to test extreme cases of distortion of the RF frequency spectrum caused by modulated signal (modulation switching Output RF spectrum)

The test unit 1 may for instance be used to optimise the frequency behaviour of one or more components 21,22 of a transmitter 2 of modulated signals. For example, the test pattern T may be used to generate the modulated test signal $S_{RF}$ and cause the tested component(s) of the transmitter 2 to output a signal. As shown in FIG. 1, for instance, the signal may be outputted by the transmitter 2 via an antenna 4. A receiving unit 3 may receive the outputted signal outputted by the component in response to inputting the test pattern in the component. The receiving unit 3 may for example determine frequency components in the received signal caused by first signal part S1 and the second signal part S2 respectively. For instance, the receiving unit 3 may determine a first frequency component during a first period of time corresponding to the first signal part S1 and determine a second frequency component during a second period of time corresponding to the second signal part S2. The determined frequency components may then be compared with one or more criteria and one or more parameters of the component 21,22 may be adjusted when the comparison meets an adjust criterion. The parameters may for example include one or more of: the quiescent currents of one or more RF transistors of a power amplifier, pre-distortion coefficients and/or settings of a transmitter, or any other suitable parameters. The parameter(s) may for example be adjusted by minimizing the rejected upper side band and/or lower side band of RF spectrum signal.

As for instance shown in FIG. 9A, for example, the modulated signal spectrum caused by the first predetermined data sequence T1 may for example have peaks in the frequency spectrum at positions $f_0 \pm n^* f_m$, $n=0, \pm 1, \pm 2, \ldots$ and the peaks at $f_0 - n^* f_m$ may be higher than the peaks at $f_0 + n^* f_m$. As shown in FIG. 9B, for instance, the modulated signal spectrum caused by the first predetermined data sequence T1 may for example have peaks in the frequency spectrum at positions $f_0 \pm n^* f_m$, $n= \pm 1, \pm 2, \ldots$ and the peaks at $f_0 - n^* f_m$ may be lower than the peaks at $f_0 + n^* f_m$. In FIGS. 9A and 9B an EDGE burst signal has been outputted with a centre frequency $f_0$ of about 118 kHz and $f_m$ of 270 kHz using first and second data patterns in the data part of the EDGE burst corresponding to the sequences listed in Table 4. As shown in FIGS. 9A and 9B by inserting a suitable data pattern, for instance the frequency spectrum of the signal may be adjusted and accordingly, for example, the maximum intensity in a certain frequency band may be determined. For instance, the intensity of the frequency band at $f_0 \pm 2^* f_m$ may be determined and compared to a threshold. For example, the EDGE standard specifies a limit to the intensity at this frequency band, which in EDGE modulated signal lies at $f_{modulation} \pm 400$ kHz with $f_{modulation}$ being the carrier frequency. Thus, by adjusting the parameters of the components 20,21 until this frequency band meets this limit, the components 20,21 can be made to comply with the requirements of the EDGE standard.

As shown in FIG. 1, the receiving unit 3 may be connectable to one or more (?) of the components 21,22 in order to receive a signal outputted by the respective component 21,22 in response to inputting the test pattern T (or the test signal $S_{test}$) in the component. The receiving unit 3 may, as shown in FIG. 1, for example include an antenna 31 for receiving a wireless signal transmitted by the transmitter 2. The antenna 31 may be connected to a receiver (RX) which can, for example, convert the received, modulated signal into a baseband signal or determine the frequency components present in the received signal. The receiver RX 32 may for example include a spectrum analyser or any communication test equipment. The RX 32 may for example determine the frequency components in a frequency range with a lower limit at frequency $f_1$ and with an upper limit at frequency $f_2$, which frequency range includes the centre frequency $f_0$ of the received, modulated signal. $f_1$ may for example be about 600 kHz lower than the carrier frequency, such as for instance 550 kHz, such as 541.6 kHz for instance. $F_2$ may for example be about 600 kHz higher than the centre frequency $f_0$, such as for instance 550 kHz, such as 541.6 kHz higher for instance. The centre frequency $f_0$ may for example be shifted relative to the carrier frequency used to modulate the signal at the transmission side. The centre frequency may for example be in the range between 100 kHz and 150 kHz, $f_0$ instance between 110 kHz and 125 kHz, such as approximately 118 kHz. As explained above, experimental results have been obtained with $f_0=118.67$ KHz and $f_1=f_0-270.83$ KHz $f_2=f_0+270.83$ KHz. For instance, from the part of the received signal corresponding to the first signal part S1 (and hence the first predetermined sequence T1) a first frequency spectrum within the frequency band may be determined. From the part of the received signal corresponding to the second signal part S2 (and hence the second predetermined sequence T2), for instance, a second frequency spectrum within the frequency range may be determined. From the first and second frequency spectra, one or more parameters may be compared. For instance, the first and second frequency spectra may be compared with each other in a sub range which lies between the carrier frequency $f_0$ and the upper limit $f_2$ of the frequency range and/or a sub range which lies between the carrier frequency $f_0$ and the lower limit $f_1$ of the frequency range.

Figure 3:
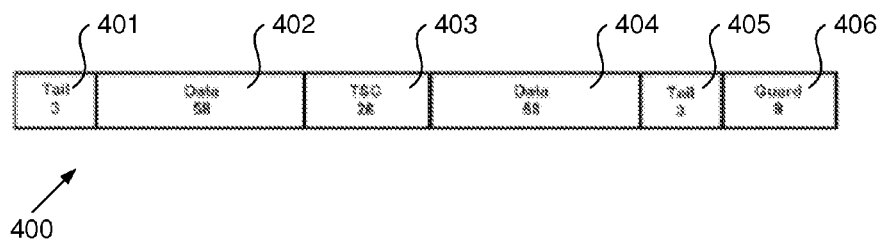
FIG. 3 shows an example of a data packet.

The test pattern T may be inputted to the transmitter 2 in any suitable manner and the data source 11 may be any type of data source suitable for the specific implementation. For instance, the data source 11 may generate data packets with a payload in which the predetermined data sequences T1,T2 are included, or generates the sequences T1 and/or T2 in a continuous manner. The data packets may for example comply with a data communication standard, and may for instance be EDGE bursts. Referring to FIG. 3, a structure of an example of a data packet 400 is shown. As shown in this example, the data packet 400, in which the first and second data sequences T1,T2 are included, may comply with the definition of a normal data packet, also referred to in the art as a 'burst', as defined in the EDGE standard. The data source 11 may also have a burst mode for outputting a sequence of one or more bursts and may output the first and second signal parts S1,S2 in the same burst.

As shown, the data packet 400 may include an initial tail 401, a first data part 402, a training sequence 403, a second data part 404, a final tail 405 and a guard period 406. Each segment 401-406 may for example have the number of symbols as listed in Table 1.

TABLE 1

| part | symbols |
|---|---|
| initial tail 401 | 3 |
| first data part 402 | 58 |
| training sequence 403 | 26 |
| second data part 404 | 58 |
| final tail 405 | 3 |
| guard period 406 | 8 |

The initial tail 401 ramp-up of the test signal outputted by the transmitter 2. The training sequence 403 may be used to determine characteristics of the communication channel. The final tail 405 may include data used in error correction, The guard period 406 is used during the gradual reduction (ramp-down) of the test signal. The first and second data parts 402,404 may include user data, for example data outputted by a signal processor 112.

The first and second data parts 402,404 may for instance include the test pattern T. For example, the first predetermined data sequence T1 may be included in the first data part 402 and the second predetermined data sequence T2 may be included in the second data part 404. An example of a suitable sequence of symbols of a EDGE burst is listed in Table 2, in which the predetermined sequences T1,T2 are shown in bold typeface and underlined. It will, however, be apparent that other sequences may also be used.

TABLE 2

| | |
|---|---|
| tail 401 | 7 7 7 |
| data 402 | 6 5 1 2 5 7 0 4 3 6 4 1 0 5 6 3 0 5 1 2 3 6 1 6 1 6 1 6 1<br>6 1 6 1 6 5 1 4 4 7 7 2 2 1 1 4 4 7 7 4 1 2 6 6 1 1 3 3 4 |
| test 403 | 7 7 1 7 7 1 7 1 1 1 7 7 7 7 1 7 7 7 1 7 7 1 7 1 1 1 |
| data 404 | 4 1 2 7 3 2 0 1 5 4 6 4 1 3 1 3 3 0 0 7 0 7 7 2 2 6 2 6 6<br>3 3 4 3 4 4 7 7 6 5 1 2 5 7 0 4 3 6 4 1 0 5 6 3 0 5 1 0 3 |
| tail 405 | 7 7 7 |

As shown in table 2, the test pattern, formed in the example of Table 2 by the data in the first and second data parts 402,404, may include, in addition to the predetermined sequences T1,T2 additional data The test pattern T of data may for example include compensating data which compensate a parameter of the test signal $S_{test}$ for an effect on the parameter caused by the first predetermined data sequence T1 and/or by the second predetermined data sequence T2. For instance, the compensation data may be selected such that the power level of the modulated signal $S_{RF}$ is compensated, relative to a power level of a reference modulated signal. The compensation data may for example be a pseudo random sequence (PN15 for example). conformed to a peak-to-average and a peak-to-minimum of an EDGE modulated signal.

The first predetermined data sequence T1 and the second predetermined data sequence T2 may differ in any suitable manner. For example, the first predetermined data sequence T1 and the second predetermined data sequence T2 may cause in the modulated signal $S_{RF}$ a first signal part S1 and a second signal part S2 respectively, which differ in the frequency components in any suitable manner. For example, the first signal part S1 may have one or more frequency components with a frequency $f_+$ above a carrier frequency $f_0$ which have a higher intensity than corresponding frequency component(s) $f_+$ in the second signal part S2. The second signal part S2 may have one or more frequency components with a frequency f below the carrier frequency $f_0$ with a higher intensity than a corresponding frequency component in the first signal part S1.

The first signal part S1 and the second signal part S2 may for example each have the frequency spectrum of a single-sideband modulated signal. The frequency component of the first signal part S1 may for example be the first upper side band of the modulated signal $S_{rf}$ above the carrier frequency $f_0$ and/or the frequency component of the second signal part S2 may be the first lower side band of the modulated signal $S_{RF}$, that is the first frequency band below the band of the carrier frequency $f_0$.

Figure 6:
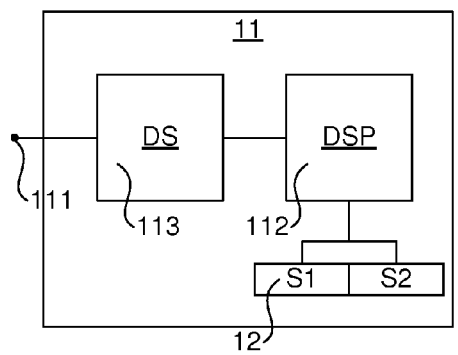
FIGS. 6 and 7 show block diagrams of examples of embodiments of a data source.

The test unit 1 may be implemented in any manner suitable for the specific implementation. The test unit 1 may for instance include one or more units which perform different functions. As shown in FIG. 6, for instance, the test unit 1 may include a signal processor 112 which generates base-band data and a modem 113 which may perform data coding and/or modulation and/or burst formation and/or burst timing, for example. The modem 113 may for example be positioned, in a signal processing direction, downstream of the signal processor 111. The modem 113 may perform transmission and/or reception related functions, such as coding the base band data, in which the first and second data sequence T1,T2, generated by the signal processor, generating data packets in which the base-band data is included the base-band data, controlling the timing of the transmission of the data. The modem 113 may for example code the base-band data in which the first and second data sequence T1,T2 are included, by performing one or more of channel coding, bit interleaving, encryption, multiplexing, etc. As shown, the signal processor 112 may for example be connected to the memory 12 and generate data in which the first and second predetermined data sequence are included. The signal processor 112 may output the base-band data to the modem 113. The modem 113 may generate one or more data packets 400 in which the predetermined data sequences T1,T2 are included, for example in the payload of one or more of the data packets.

Figure 7:
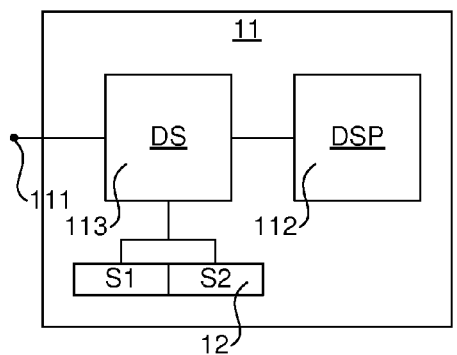

As shown in FIG. 7, it is also possible that the modem 113 is connected to the memory 12. The modem 113 may include the first and second predetermined data sequence T1,T2 in the data packet, for example by inserting at the position of the user data in the data packet 400. For instance, as is explained below, the modem 113 may insert the first and second predetermined data sequence T1, T2 in the first or second data part 402,404 of an EDGE burst.

The predetermined data sequences T1,T2 may be any sequence suitable to obtain, after modulation, the desired different frequency components. The first predetermined data sequence T1 may for instance include two or more different symbols and a transition between two successive symbols may correspond in the first signal part S1 with a first phase shift $\phi_1$ in a first direction and the second predetermined data sequence T2 may include two or more different symbols. A transition between a symbol to a following symbol may correspond to a second phase shift $\phi_2$ in a second direction opposite to the first direction. The first and second phase shift $\phi_1,\phi_2$ may for example be of the same magnitude but of opposite direction, or be of different magnitudes.

The first predetermined data sequence T1 and the second predetermined data sequence T2 may each include three, four, five or more symbols. In such a case, the first and second phase shift $\phi_1,\phi_2$ may have the same magnitude for each transition from a symbol to a following symbol. The first and second phase shifts $\phi_1, \phi_2$ may have any value suitable for the specific implementation and be in the range of larger than zero and smaller than 180 degrees. In case the test signal is a digital modulated signal, the sequences T1,T2 of symbols may be selected such that for each transition the modulated signal has a phase shift as close to 180 degrees as possible or instance, $3\pi/8$-PSK the first and second phase shifts $\phi_1, \phi_2$ may be ±157.5 degrees, with a suitable margin of error. The margin of error may for example be below the error threshold at which it is no longer possible to distinguish different symbols from each other.

The test signal $S_{test}$ may be any type of modulated signal suitable for the specific implementation. The test signal may for example be a digitally modulated signal, such as a phase shift keying modulated signal, an amplitude shift keying modulated signal or any other suitable type of signal. The test unit 1 or the transmitter 2 may include a modulating unit 21. Referring to the example of FIG. 2, there is shown a modulating unit 21 which may be used in the transmitter 2 and/or the test unit 1. The modulating unit 21 may modulate a signal inputted at an input 210 to obtain a modulated signal and output the modulated signal at the output 219. The shown example of a modulating unit 21 is a digital modulation unit, more in particular a shift keying unit, and more in particular a phase shift keying unit. The modulation unit 21 may for example be a source of m-PSK modulated signals with a phase offset of $p\pi/q$ radians, and wherein m is an integer number and m, p and q satisfy the relationship:

$$2\pi\left(\frac{n}{m} + \frac{p}{q}\right) \neq k\pi, \quad (1)$$

in which relation n is a positive integer number smaller or equal to m, and k is an integer number. M may for example be a power of 2, for example $2^3$ and p/q may for example be 3/8. The signal source may for instance be source of 8-PSK modulated signals with a $3\pi/8$ offset, from hereon referred to as $3\pi/8$-PSK.

Figure 2:
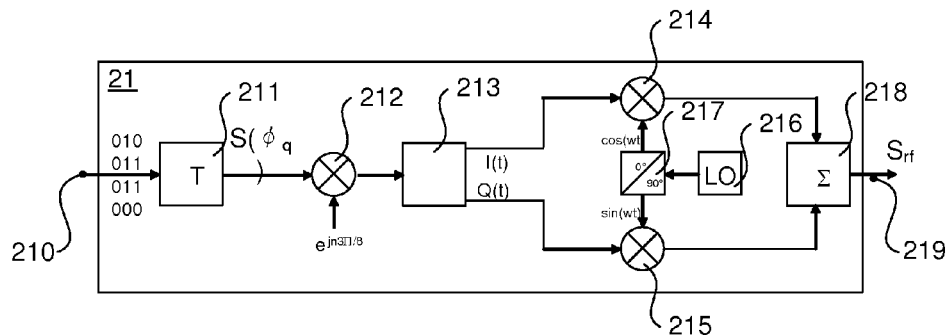
FIG. 2 shows a block diagram of an example of an embodiment of a modulator.

The modulating unit 21 may receive a sequence of binary signals representing the first and second predetermined data sequence. Referring to FIG. 2, an example of a modulation unit 21 is shown which can modulate a signal according to a digital modulation scheme, in this example phase shift keying. The modulation unit 21 may, as shown, include an data input 210 at which a sequence of data may be inputted. The data input 210 may be connected to a mapping unit 211 which includes a (not shown) memory in which data representing a relationship between data and a modulation scheme is stored. The sequence of data received by the modulation unit 21 may for example be a sequence of binary data.

The mapping unit 211 may split the incoming sequence of binary data in 3-bit sequences and map the 3-bit sequences according to mapping information stored in a memory (not shown in FIG. 2). As shown in the example of FIG. 2, the inputted sequence of binary data may for example include portions corresponding to the first and second predetermined data sequence T1,T2. E.g. supposing that the mapping unit 211 uses a Gray coding scheme and that the sequences 7214 and 70431625 are respectively selected, the inputted sequence of binary data may for example include respective corresponding portions 100,011,001,110 and 100,000,110, 010,001,101,011,111. The inputted sequences result in the outputted RF signal having a first frequency characteristic during a period of time corresponding to the first sequence, e.g. 7214, and a second frequency characteristic during a period of time corresponding to the second sequence, e.g. 70431625.

The mapping unit 211 may for example include a table which maps a n-bit binary sequences (n being an integer larger than or equal to 2) to a digital number. For instance, the table may map 3-bit sequences to decimal numbers q (e.g.

integers in the ranged from 0 to 7). The table may further map the each of decimal numbers q to a specific digital modulation mode. For instance, the modulation scheme may be a phase shift keying scheme and the table may map each of the decimal numbers q to a corresponding phase (or phase shift) $\phi_q$. For example, the modulation may be 8-PSK and the table may map each of the decimal number q (q being an integer in the range from 0 to 7), to a corresponding phase $\phi_q$. The phases $\phi_q$ may for example be equally distributed and e.g. be spaced $q*\pi/2^n$ radians. The modulating unit 21 may for example, as shown in FIG. 2, include a table in which is listed which sequence represents a certain symbol. For instance, the binary signals may be mapped to symbols using a Gray coding scheme. An example of a 3-bit Gray coding mapping of symbols and binary signals is shown in Table 3, which further shows the phase associated with a symbol for application of the 3-bit mapping in 8-phase shift keying (8-PSK). However, it should be noted that the modulating unit 21 may modulate the signal in another manner and may for example apply binary phase shift keying, quadrature phase shift keying or any other suitable kind of modulation.

TABLE 3

| Modulation Bits | 8PSK symbol | phase (radians) |
| --- | --- | --- |
| 111 | 7 | 0 |
| 011 | 3 | $\pi/4$ |
| 010 | 2 | $\pi/2$ |
| 000 | 0 | $3\pi/4$ |
| 001 | 1 | $\pi$ |
| 101 | 5 | $5\pi/4$ |
| 100 | 4 | $3\pi/2$ |
| 110 | 6 | $7\pi/4$ |

The mapping unit 211 outputs a signal with the phase $\phi_q$ defined by the mapping information to a phase rotation unit 212. The phase rotation unit 212 may add a phase rotation to the outputted signal $S_{test}$(q), in order to shift the phase of the signal. For example, the phase rotation unit 212 may cause the signal outputted by the mapping unit 211 to have an additional phase shift of $\phi_{offset}$.

The phase rotation unit 212 may for example add an additional phase shift $\phi_{offset}$. The additional phase shift $\phi_{offset}$ may for example change with each transition to a following symbol q, and for example be multiplied by an integer counter value which is increased for each transition. E.g. before a first transition the additional phase shift $\phi_{offset}$ may be 0, after the first transition the additional phase shift $\phi_{offset}$ may be $a*\pi$ radians, after a second transition the additional phase shift $\phi_{offset}$ may be $2*a*\pi$ radians, after a third transition the additional phase shift $\phi_{offset}$ may be $3*a*\pi$ radians, etc.

The phase rotation unit 212 may output the phase rotated signal $S(\phi_q+\phi_{offset})$ to a filter 213. The filter 213 may modify the phase rotated signal $S(\phi_q+\phi_{offset})$ to have a desired frequency profile. For example, the filter 213 may be a Gaussian filter, such as a linearized Gaussian filter. For instance, the filter 213 may process the phase rotated signal $S(\phi_q+\phi_{offset})$ in order to limit the frequency components in the phase rotated signal $S(\phi_q+\phi_{offset})$ to a certain bandwidth. As shown in FIG. 2, the filter 213 may be connected to one or more mixers 214,215 and input the filtered signal $S_f$ into the mixers 214, 215.

The mixers 214,215 may mix the filtered signal $S_f$ with a local oscillator (LO) signal. For instance in the example of FIG. 2, the modulation unit 21 includes a local oscillator 216 which generates a LO signal. The LO signal may for example have a base frequency which is higher than the dominant frequency in the filtered signal $S_f$. The modulation unit 21 may for example generate an I/Q signal. In the example of FIG. 2, for instance, the local oscillator 216 is connected to a phase splitter 217. The phase splitter 217 may generate two or more signals with the same frequency, but shifted in phase. For example, the phase splitter may generate a first signal $LO(\phi_1)$ with a first phase $\phi_1$ and a second signal $LO(\phi_2)$ with a second, different phase $\phi_2$ at respective outputs. The first phase $\phi_1$ may for example differ $\pi/2$ radians with respect to the second phase $\phi_2$. The phase splitter 217 may for example output the first signal $LO(\phi_1)$ at a first output connected to an input of a first mixer 214 and output the second signal $LO(\phi_2)$ at a second output connected to an output of a second mixer 215.

The mixers 214,215 may mix the filtered signal $S_f$ with the first and second local oscillator signals $LO(\phi_1)$, $LO(\phi_2)$ respectively. Thereby, respectively an in phase (I) signal and an out-of-phase signal (e.g. a quadrature (Q) signal in case of a phase difference of $\pi/2$ radians) may be obtained. The mixers 214,215 may output the respective mixed signals to a combiner which combines the first signal $LO(\phi_1)$ and second signal $LO(\phi_2)$ into the, modulated, output signal $S_{rf}$.

As shown in FIG. 1, the modulation unit 21 may be connected with an output 219 to an input 220 of a power amplifier 22. The power amplifier 22 may receive a modulated signal $S_{RF}$, for instance a signal generated by the example of a modulation unit 21 shown in FIG. 2. The power amplifier 22 may amplify the inputted signal and output the amplified signal to an output 23 of the transmitter 2, for instance via an antenna 4 or other suitable output device. In the example of FIG. 1, the transmitter 2 is an wireless transmitter and, via the antenna 4, wireless signals may be outputted. More in particular, the transmitter is a transmitter of RF signals and via the antenna 4 electromagnetic waves may be outputted.

FIG. 8 schematically illustrates a $3\pi/8$-PSK method. As shown in FIG. 8, the phase of the signals is shifted corresponding to the symbol (0,1,2 . . . 7). After the (thus phase shifted) signal is outputted the mapping of symbols is rotated with an additional phase shift of $+3\pi/8$ radians, for each transition from a current symbol to a following symbol. For instance, supposing the current symbol is 0, corresponding to a phase shift of 0 (and to a binary sequence of 0,0,0), and the next symbol is 1, corresponding to a phase shift of $\pi/4$ (and to a binary sequence of 0,0,1), the signal will be phase shifted with $3\pi/8+\pi/4=7\pi/8$ radians. The first predetermined data sequence T1 of: and the second predetermined data sequence T2 may for example be selected from symbol sequences listed in Table 4

TABLE 4

| T1 | T2 |
| --- | --- |
| 7214 | 70431625 |
| 6305 | 62570431 |
| 5630 | 57043162 |
| 4721 | 43162570 |
| 3056 | 31625704 |
| 2147 | 25704316 |
| 1472 | 16257043 |
| 0563 | 04316257 |

It is found that when modulated with $3\pi/8$-PSK method such a symbol sequence result in a modulated signal with distinct frequency characteristics which allow an accurate testing of the components 21,22 of the transmitter 2.

The invention may also be implemented in a computer program for running on a computer system, at least including code portions for performing steps of a method according to the invention when run on a programmable apparatus, such as a computer system or enabling a programmable apparatus to perform functions of a device or system according to the invention. Such a computer program may be provided on a data carrier, such as a CD-rom or diskette, stored with data loadable in a memory of a computer system, the data representing the computer program. The data carrier may further be a data connection, such as a telephone cable or a wireless connection. Such a computer program may for example be used to simulate the performance of one or more components of a transmitter or to test a design of such components.

In the foregoing specification, the invention has been described with reference to specific examples of embodiments of the invention. It will, however, be evident that various modifications and changes may be made therein without departing from the broader spirit and scope of the invention as set forth in the appended claims. For example, other modulation schemes may be used. Furthermore, the test unit 1 may be used to test transmitters that may be used in a telecommunication system, such as a mobile telephone network or any other suitable type of network Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, the modulation unit 21 may be implemented as two or more semiconductor devices and include a separate local oscillator implemented on a different piece of semiconductor than e.g. the mapping unit.

Also, devices functionally forming separate devices may be integrated in a single physical device. For example, the modulation unit 21 and/or the power amplifier and/or the antenna 4 may be implemented in a single integrated circuit package.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the words 'a' and 'an' shall not be construed as limited to 'only one', but instead are used to mean 'one or more', and do not exclude a plurality. The mere fact that certain measures are recited in mutually different claims does not indicate that a combination of these measures cannot be used to advantage.

The invention claimed is:

1. A test unit for testing frequency characteristics of at least one component of a transmitter of modulated signals, comprising:
  a data source for generating a test pattern of data;
  a test unit output connected to said data source and connectable to an input of said at least one component, to input said test pattern of data to said at least one component; and
  a memory to store a first predetermined data sequence and a second predetermined data sequence;
  wherein said data source is connected with an data input to said memory, and said data source is arranged to generate said test pattern of data including said first and second predetermined data sequences; and
  wherein when a modulated signal is generated in accordance with said test pattern of data, the modulated signal includes a first signal part with a first frequency spectrum caused by said first predetermined data sequence and a second signal part after said first signal part, wherein second signal part has a second frequency spectrum caused by said second predetermined data sequence.

2. A test unit as claimed in claim 1, further including:
  a receiving unit connectable to said at least one component, for receiving a signal outputted by said at least one component in response to inputting said test pattern in said at least one component.

3. A test unit as claimed in claim 1, wherein said first signal part and said second signal part are modulated signals, said first signal part having at least one frequency component with a first frequency above a carrier frequency with a higher intensity than a corresponding frequency component in the second signal part, and said second signal part having at least one frequency component with a second frequency below said carrier frequency with a higher intensity than a corresponding frequency component in the first signal part.

4. A test unit as claimed in claim 3, wherein said frequency component of the first signal part is a first upper side band of the modulated signals above the carrier frequency and wherein said frequency component of the second signal part is a first lower side band of the modulated signals below the carrier frequency.

5. A test unit as claimed in claim 3, wherein said first signal part and said second signal part each exhibit a frequency spectrum of a single-sideband modulated signal.

6. A test unit as claimed in claim 1, wherein a signal source is arranged to generate a phase modulated signal.

7. A test unit as claimed in claim 6, wherein said first data sequence includes at least two different symbols and wherein a transition between two successive symbols corresponds in said first signal part with a first phase shift in a first direction, said second data sequence includes at least two different symbols, and a transition between a symbol to a following symbol corresponding to a second phase shift in a second direction opposite to said first direction.

8. A test unit as claimed in claim 7, wherein said first data sequence and said second data sequence each include at least three symbols and wherein said first and second phase shifts have a same magnitude for each transition from the symbol to the following symbol.

9. A test unit as claimed in claim 7, wherein said first and second phase shifts are in a range of larger than zero and smaller than 180 degrees.

10. A test unit as claimed in claim 1, wherein a signal source is a source of m-PSK modulated signals with a phase offset of pπ/q radians, and wherein m is an integer number and m, p, and q satisfy a relationship:

$$2\pi\left(\frac{n}{m} + \frac{p}{q}\right) \neq k\pi,$$

in which relation n is a positive integer number smaller or equal to m, and k is an integer number.

11. A test unit as claimed in claim 1, wherein a signal source is a source of 8-PSK modulated signals with a 3π/8 offset, and said first data sequence and/or said second data sequence are selected from a group of symbol sequences consisting of: 7214, 6305, 5630, 4721, 3056, 2147, 1472, 0563, 70431625, 62570431, 57043162, 43162570, 31625704, 25704316, 16257043, and 04316257.

12. A test unit as claimed in claim 1, wherein a signal source has a burst mode to output at least one signal burst and wherein said signal source is arranged to output said first and second signal parts in a same signal burst.

13. A test unit as claimed in claim 1, wherein a signal source includes a data processor for assembling a data packet which includes said test pattern.

14. A test unit as claimed in claim 13, wherein said data processor is arranged to include said test pattern in a part of the data packet selected from a group consisting of: tail, data, mid-amble, and guard.

15. A test unit as claimed in claim 1, wherein said test pattern of data includes compensating data to compensate for an effect on a parameter of a test signal, wherein the effect on said parameter is caused by the first predetermined data sequence, the second predetermined data sequence, or the first predetermined data sequence and the second predetermined data sequence.

16. A transmitter unit including the test unit as claimed in claim 1.

17. A method for testing a frequency behaviour of at least one component of a transmitter of modulated signals, comprising:
generating a test signal from a test pattern of data, wherein the test pattern includes a first predetermined data sequence and a second predetermined data sequence, and wherein the test signal includes a first signal part with a first frequency spectrum caused by said first predetermined data sequence, and a second signal part with a second frequency spectrum caused by said second predetermined data sequence; and
inputting said test signal in said at least one component.

18. A component of the transmitter tested with a method as claimed in claim 17.

19. A non-transitory computer program product loadable in a memory of a programmable apparatus, wherein the computer program product includes program code portions for executing a method as claimed in claim 17 when run by said programmable apparatus.

* * * * *